(12) United States Patent
Chien et al.

(10) Patent No.: US 7,842,153 B2
(45) Date of Patent: Nov. 30, 2010

(54) DECAL METHOD FOR TRANSFERRING PLATINUM-AND PLATINUM ALLOY-BASED CATALYSTS WITH NANONETWORK STRUCTURES

(75) Inventors: Chun-Ching Chien, Taipei (TW); King-Tsai Jeng, Taoyuan County (TW)

(73) Assignee: Atomic Energy Council-Institute of Nuclear Energy Research, Taoyuan (TW)

( * ) Notice: Subject to any disclaimer, the term of this patent is extended or adjusted under 35 U.S.C. 154(b) by 1025 days.

(21) Appl. No.: 11/473,023

(22) Filed: Jun. 23, 2006

(65) Prior Publication Data

US 2010/0227254 A1 Sep. 9, 2010

(51) Int. Cl.
| | |
|---|---|
| B44C 1/175 | (2006.01) |
| B32B 7/14 | (2006.01) |
| B32B 37/06 | (2006.01) |
| B32B 37/12 | (2006.01) |
| B32B 38/10 | (2006.01) |
| B29C 65/52 | (2006.01) |
| B32B 37/16 | (2006.01) |
| B29C 65/56 | (2006.01) |
| B29C 65/72 | (2006.01) |

(52) U.S. Cl. .............. 156/236; 156/230; 156/247; 156/291; 156/295; 156/322

(58) Field of Classification Search .......... 156/230, 156/236, 247, 291, 295, 322

See application file for complete search history.

(56) References Cited

U.S. PATENT DOCUMENTS

| | | | | |
|---|---|---|---|---|
| 5,879,827 | A * | 3/1999 | Debe et al. | 429/40 |
| 5,910,378 | A * | 6/1999 | Debe et al. | 429/42 |
| 6,042,959 | A * | 3/2000 | Debe et al. | 429/33 |
| 6,136,412 | A * | 10/2000 | Spiewak et al. | 428/143 |
| 6,524,736 | B1 * | 2/2003 | Sompalli et al. | 429/42 |
| 6,787,500 | B2 * | 9/2004 | Ito et al. | 502/180 |
| 6,911,411 | B2 * | 6/2005 | Cox et al. | 502/159 |
| 7,022,638 | B2 * | 4/2006 | Kaji et al. | 502/101 |
| 7,220,514 | B2 * | 5/2007 | Yasumoto et al. | 429/490 |
| 7,285,354 | B2 * | 10/2007 | Ueyama et al. | 429/535 |
| 7,291,419 | B2 * | 11/2007 | Yan et al. | 429/483 |
| 7,390,528 | B2 * | 6/2008 | Morii | 427/115 |
| 7,785,435 | B2 * | 8/2010 | Sompalli et al. | 156/237 |
| 2002/0144394 | A1 * | 10/2002 | Uchida et al. | 29/623.5 |
| 2003/0143454 | A1 * | 7/2003 | Hatoh et al. | 429/44 |
| 2004/0038808 | A1 * | 2/2004 | Hampden-Smith et al. | 502/180 |
| 2005/0053826 | A1 * | 3/2005 | Wang et al. | 429/44 |
| 2005/0164072 | A1 * | 7/2005 | Yan et al. | 429/42 |
| 2005/0200040 | A1 * | 9/2005 | Hara et al. | 264/104 |

* cited by examiner

*Primary Examiner*—Philip C Tucker
*Assistant Examiner*—Sonya Mazumdar
(74) *Attorney, Agent, or Firm*—Jackson IPG PLLC; Demian K. Jackson

(57) ABSTRACT

Platinum- and platinum alloy-based catalysts with nanonetwork structures are formed on a substrate at first. Then, a support of a proton exchange membrane is taken. In the end, the catalysts are transferred to the support.

11 Claims, 6 Drawing Sheets

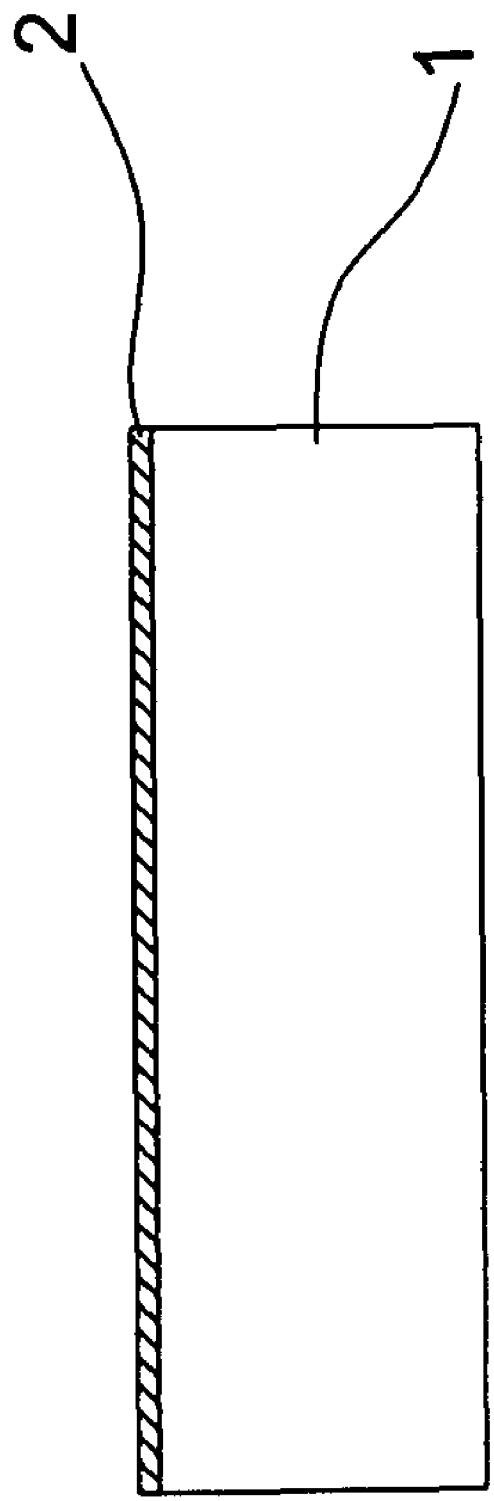

DECAL METHOD FOR TRANSFERRING PLATINUM- AND PLATINUM ALLOY-BASED CATALYSTS WITH NANONETWORK STRUCTURES

FIELD OF THE INVENTION

The present invention relates to a method for transferring catalysts; more specifically, relates to transferring platinum- and platinum alloy-based catalysts with nanonetwork structures grown on a substrate to a support of a proton exchange membrane.

DESCRIPTION OF THE RELATED ARTS

In general, nanocatalysts for uses in a Direct Methanol Fuel Cell (DMFC) or a Proton Exchange Membrane Fuel Cell (PEMFC) are applied in three ways: (1) being directly coated on a proton exchange membrane; (2) being coated on a separable substrate and than transferred to a proton exchange membrane; and (3) being coated on an electrode backing and than hot-pressed onto a proton exchange membrane. Therein, the first two methods generally use less amounts of catalysts than the third one.

Conventional methods regarding to catalytic electrode fabrications for membrane fuel cell applications have been described in many patents. For example, a first prior art is proclaimed in Taiwan, entitled "A catalyst electrode for a fuel cell, a fuel cell using the catalyst electrode, and fabrication methods thereof". In the first prior art, a fuel call using a catalyst electrode comprises a substrate and a catalyst layer, where the catalyst layer is cohered to the substrate and has catalyst-supporting carbon particles and solid polymer electrolyte. And either the substrate or the catalyst layer has a defoaming agent.

A second prior art, entitled "A fuel cell, an electrode for fuel cell and fabrication methods thereof", is proclaimed in Taiwan. In the second prior art, an electrode for fuel cell comprises a substrate; a current collector deposed on a side surface of the substrate; and a catalyst layer deposed on another side surface of the substrate, where the current collector is bound with the substrate.

The above two methods for fabricating conventional carbon-supported catalysts are complex and thus costs are high. Hence, the prior arts do not fully fulfill users' requests on practical applications.

Recently, a group of platinum- and platinum alloy-based catalysts with nanonetwork structures, which are made of noble metals and use no carbon-supporting materials, have been developed by the inventors' group. These novel catalysts, such as Pt, Pt—Ru, Pt—Ru—Ir, Pt—Ru—Rh, etc., are aimed to be used in DMFCs or PEMFCs with high potentials in improving fuel cell performances and reducing electrode fabrication costs. But, these carbon-free catalysts were directly prepared on a substrate which were not readily separable, therefore the catalysts could not be satisfactorily transferred to a proton exchange membrane using a simple decal approach. This invention provides an effective means to solve the serious problem encountered.

SUMMARY OF THE INVENTION

The main purpose of the present invention is to transfer platinum- and platinum alloy-based catalysts with nanonetwork structures grown on a substrate to a support of a proton exchange membrane.

To achieve the above purpose, the present invention is a decal method for transferring platinum- and platinum alloy-based catalysts with nanonetwork structures, comprising steps of: (a) spraying a polymeric thin film on a substrate; (b) growing a platinum- or a platinum alloy-based catalyst with a nanonetwork structure on the polymeric thin film; (c) processing a heat treatment to decompose the polymeric thin film and separate the substrate; and (d) applying a binder to a surface of a proton exchange membrane support to bind the proton exchange membrane support and the catalysts to transfer the catalysts through the aid of a hot-press treatment. Accordingly, a novel decal method for transferring platinum- and platinum alloy-based catalysts with nanonetwork structures to a proton exchange membrane is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is a view showing the flow chart of the preferred embodiment according to the present invention;

DESCRIPTION OF THE PREFERRED EMBODIMENT

Figure 1:
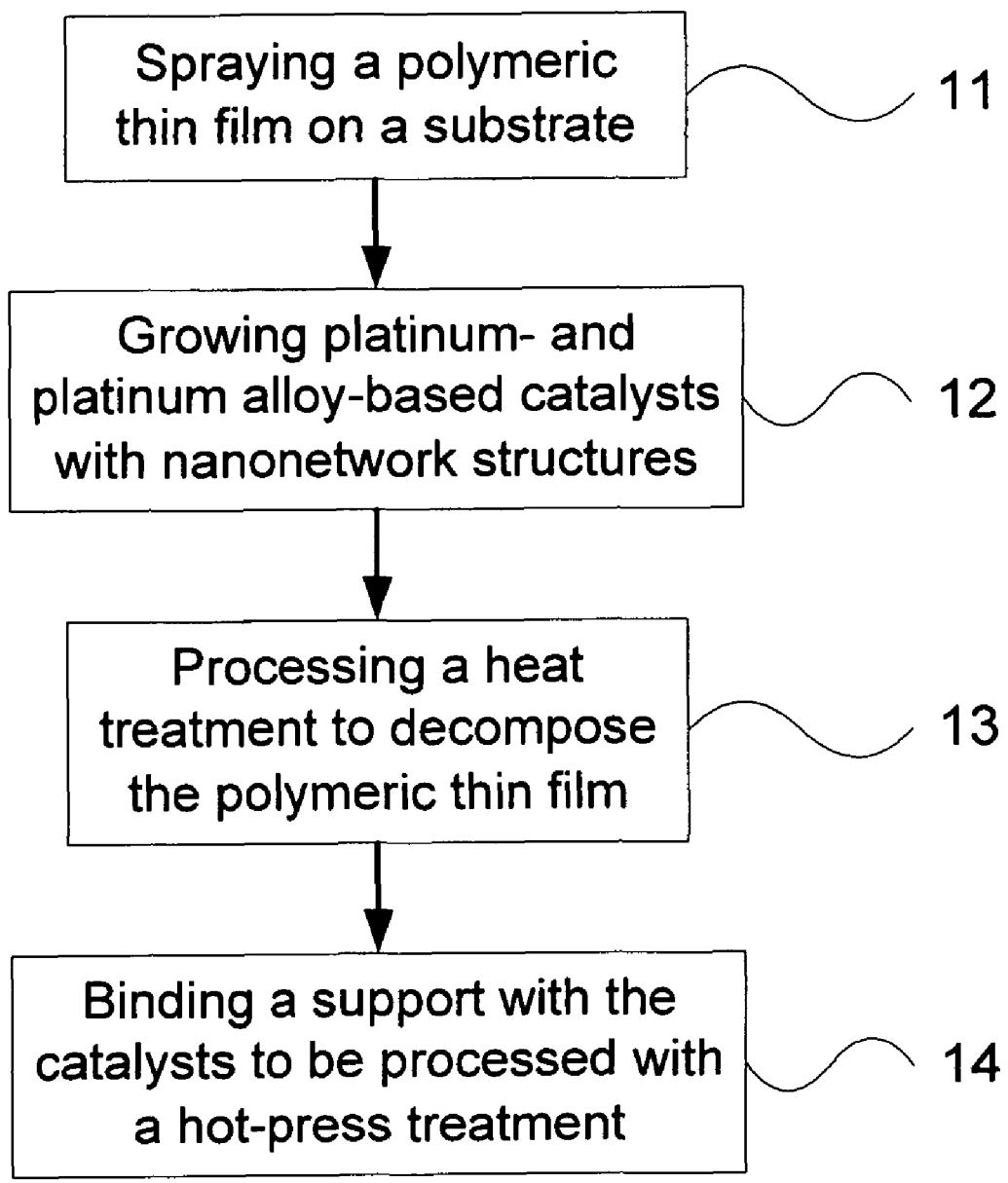
FIG. 1A to FIG. 1D are views showing the step (a) to the step (d)
Figure 1B:
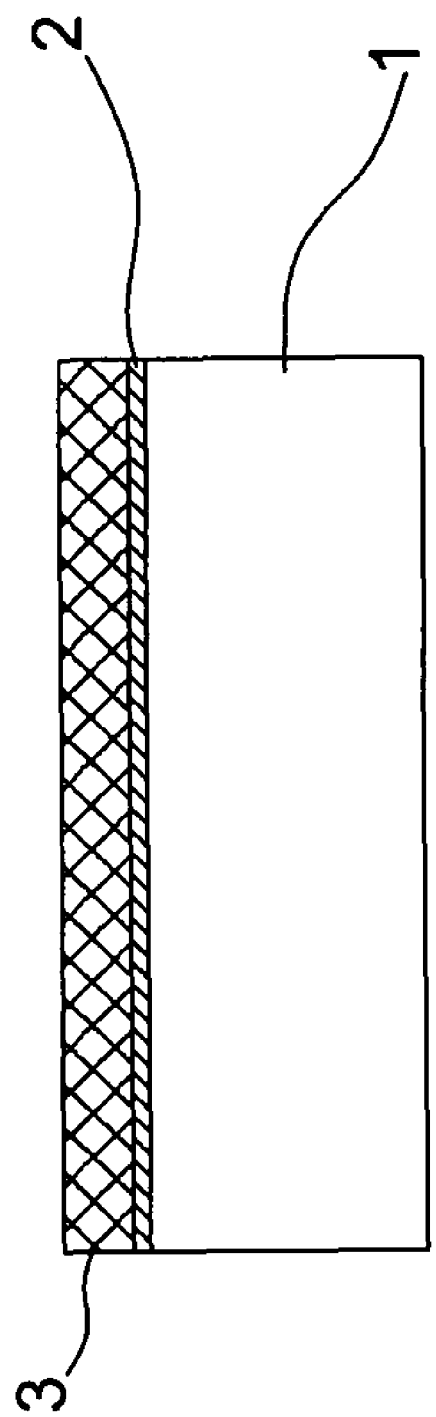
Figure 1C:
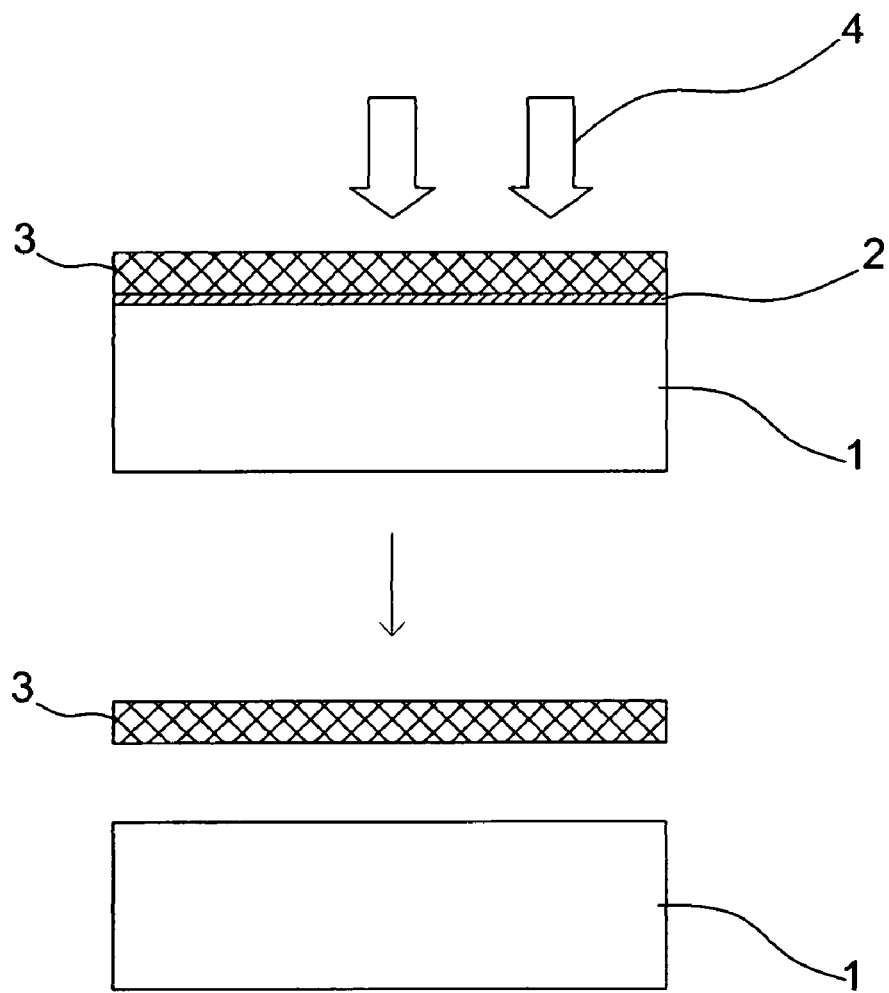
Figure 1D:
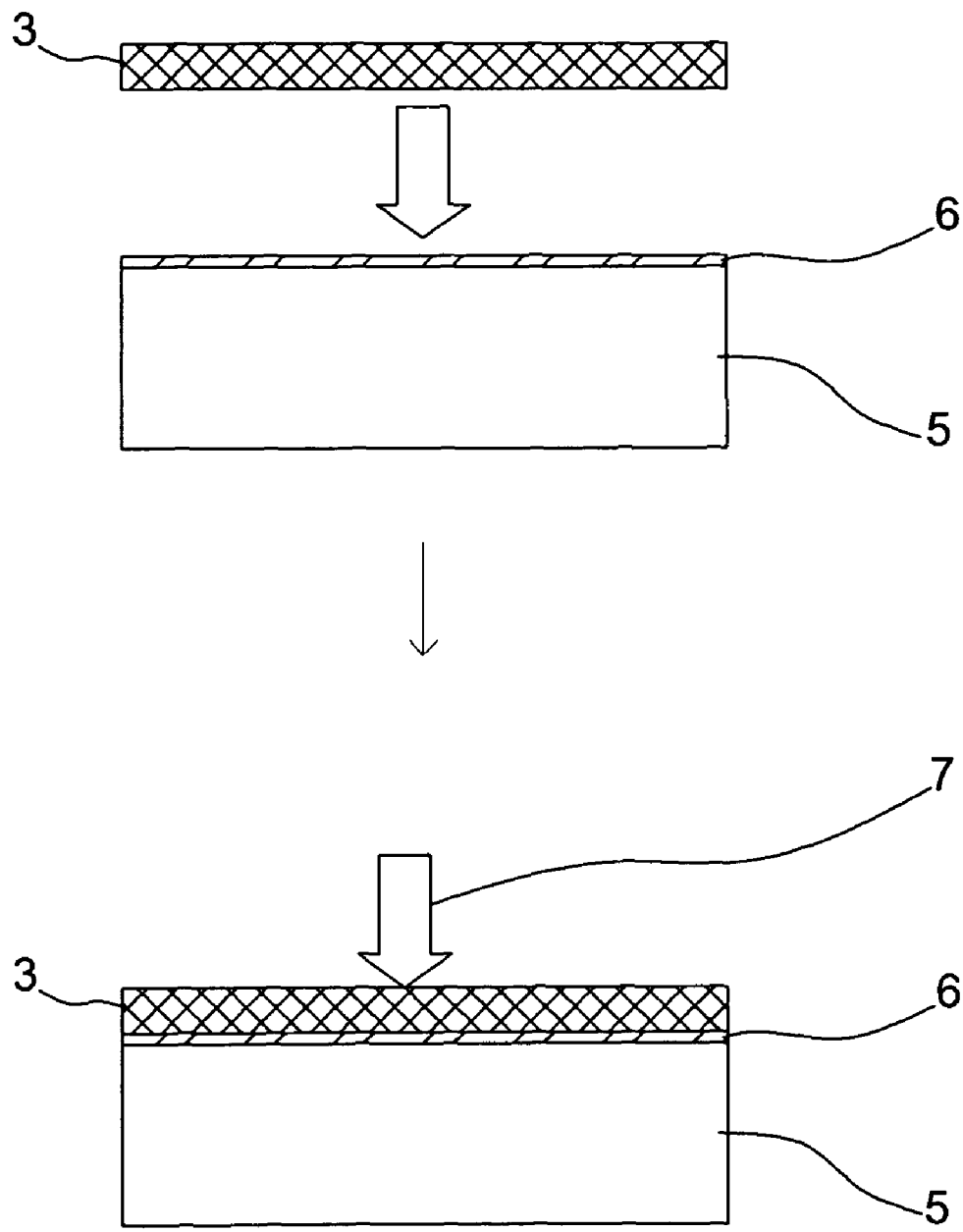

The following description of the preferred embodiment is provided to understand the features and the structures of the present invention.

Please refer to FIG. 1, FIG. 1A, FIG. 1B, FIG. 1C and FIG. 1D, which are a view showing a flow chart of a preferred embodiment according to the present invention and views showing step (a), step (b), step (c) and step (d). As shown in the figures, the present invention is a decal method for transferring platinum- and platinum alloy-based catalysts with nanonetwork structures, where platinum- and platinum alloy-based catalysts with nanonetwork structures are transferred onto a support. The method of the present invention comprises the following steps:

(a) Spraying a polymeric thin film on a substrate 11: A polymeric thin film is sprayed on a substrate 1, where the substrate 1 is a metal, a ceramic or a glass; the polymeric thin film 2 is a polyethylene polymeric film or a Teflon film. The polymeric thin film 2 sprayed on the substrate has a very thin thickness and is smooth.

(b) On the polymeric thin film, growing platinum- and platinum alloy-based catalysts with nanonetwork structures 12: Platinum- and platinum alloy-based catalysts with nanonetwork structures are grown on the polymeric thin film 2.

(c) Processing a heat treatment to decompose the polymeric thin film 13: A heat treatment 4 is processed to decompose the polymeric thin film 2 so that the substrate 1 and catalysts 3 are separated, where the heat treatment 4 is operated at a temperature below 500 Celsius degree (° C.).

(d) Binding a proton exchange membrane support with the catalysts to be processed with a hot-press treatment 14: In the end, a binder 6 is sprayed on a surface of a support 5; and the catalysts 3 is bound on the surface sprayed with the binder 6. Through a hot-press treatment 7, the catalysts 3 are transferred onto the support 5. Therein, the support 5 is a Nafion proton exchange membrane manufactured by DuPont Company; and, the binder is a Nafion solution.

Hence, a novel decal method for transferring platinum- and platinum alloy-based catalysts with nanonetwork structures is obtained.

Figure 2:
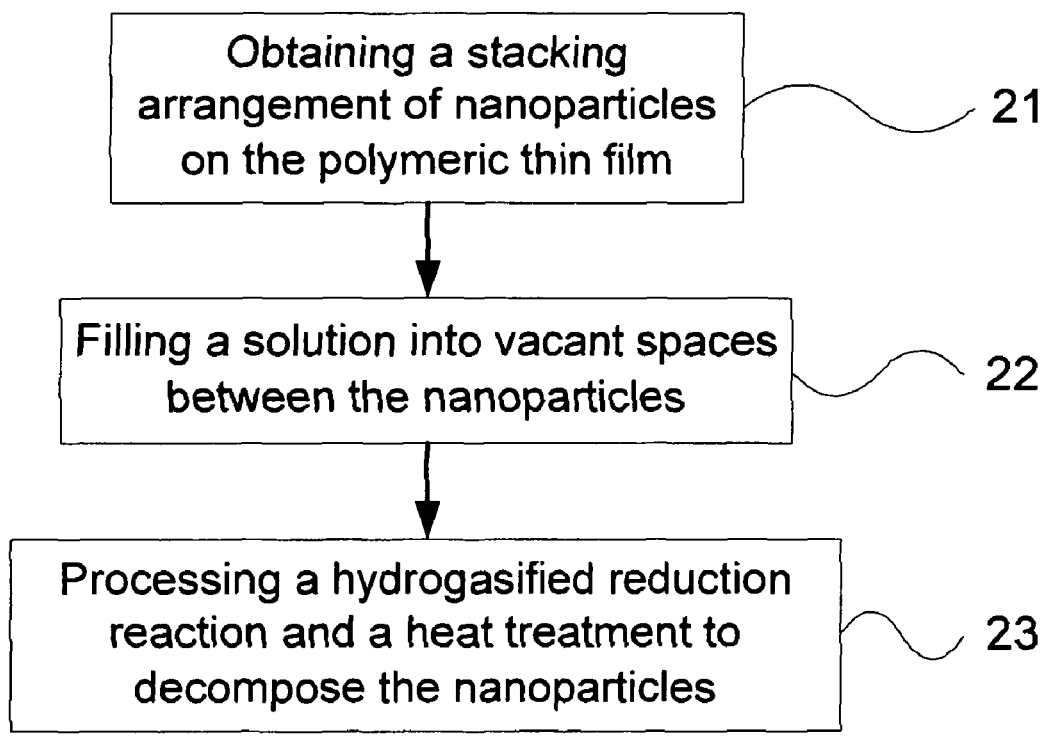
FIG. 2 is a view showing the flow chart of the step (b)

Please refer to FIG. 2, which is a view showing the flow chart of step (b). As shown in the figure, the step (b) further comprises the following steps:

(I) Obtaining a stacking arrangement of nanoparticles (or nanospheres) on the polymeric thin film 21: A solvent mixture having a certain density of nanoparticles is obtained to be sprayed on a surface of the polymeric thin film and then the solvent mixture is hot-dried to obtain a stacking arrangement of the nanoparticles on the polymeric thin film through a self-assembly function of the nanoparticles. Therein, the nanoparticles are organic polymer particles of polystyrene (PS) particles or polymethyl methacrylate (PMMA) particles, or inorganic compound particles of silicon dioxide ($SO_2$) particles; the nanoparticle has a granular diameter between 50 nanometers (nm) and 500 nm; and, the nanoparticles are cohered on the polymeric thin film to obtain at least one layer of nanonetwork through at least one layer of face-centered, cubic lattices.

(II) Filling said a solution into vacant (or interstitial) spaces between the nanoparticles 22: A solution is filled into vacant spaces between the nanoparticles, where the solution is a metal ion solution; the metal ion solution contains a pure metal ion or a mixture of $Pt^{2+}$, $Pt^{4+}$, $Ir^{3+}$, $Rh^{3+}$, $Ru^{3+}$ $Pd^{2+}$ and $Os^{3+}$. The method used for forming catalyst in the vacant spaces between the nanoparticles can be a hydrogen reduction or a chemical reduction. Alternatively, a vacuum sputtering process can be used to deposit catalyst metal element in the vacant spaces between the nanoparticles.

(III) Processing a hydrogasified reduction reaction and a heat treatment to decompose the nanoparticles 23: And a structure obtained through the above two steps are processed through a hydrogasified reduction reaction to obtain metal catalysts. Then, the obtained structure is processed with a heat treatment to decompose the nanoparticles for obtaining platinum- and platinum alloy-based catalysts with nanonetwork structures on the polymeric thin film. Therein, if the nanoparticles are organic polymer particles, the structure is sent into a high temperature furnace or an air oxidation furnace to be heated at a temperature below 500° C. If the nanoparticles are inorganic compound particles, a hydrofluoric acid solution is added to be heated at a temperature below 100° C. By doing so, the nanoparticles are decomposed.

Through the above steps of step (a) to step (d), platinum- and platinum alloy-based catalysts with nanonetwork structures on a proton exchange membrane support are obtained to be applied to a direct methanol fuel cell (DMFC) or a proton exchange membrane fuel cell (PEMFC).

To sum up, the present invention is a decal method for transferring platinum- and platinum alloy-based catalysts with nanonetwork structures, where, through a simple procedure, platinum- and platinum alloy-based catalysts with nanonetwork structures grown on a substrate is transferred to a support of a proton exchange membrane.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A decal method for transferring platinum- and platinum alloy-based catalysts with nanonetwork structures, comprising steps of:
   (a) spraying a polymeric thin film on a substrate;
   (b) growing platinum- and platinum alloy-based catalysts on said polymeric thin film by the steps of:
      (I) spraying a solvent mixture having a certain density of nanoparticles wherein said nanoparticles comprise a plurality of silicon dioxide particles on a surface of said polymeric thin film and hot-drying said solvent mixture to obtain a stacked arrangement of said nanoparticles of at least one layer of a face-centered cubic lattice nanonetwork structure on said polymeric thin film through a self-assembly function of said nanoparticles, wherein the solvent mixture is selected from a group consisting of a hydrous solvent mixture and an organic solvent mixture;
      (II) filling a metal ion solution into vacant spaces between said nanoparticles wherein the solution comprises a metal ion or a metal ion mixture or vacuum sputtering a catalyst metal element into vacant spaces between said nanoparticles, and
      (III) processing a hydrogasified reduction reaction and a first heat treatment to decompose said nanoparticles to obtain said platinum- and platinum alloy-based catalysts with nanonetwork structures on said polymeric thin film;
   (c) processing a second heat treatment to decompose said polymeric thin film to separate said substrate and said catalysts; and
   (d) spraying a binder on a surface of a proton exchange membrane support to bind said support with said catalysts so as to transfer said catalysts on said support through a hot-press treatment,
   wherein a hydrofluoric acid solution is added and wherein the second heat treatment is operated at a temperature lower than 100 Celsius degree (° C.).

2. The method according to claim 1, wherein said substrate is made of a material selected from a group consisting of a metal, a ceramic, and a glass.

3. The method according to claim 1, wherein said polymeric thin film is selected from a group consisting of a polyethylene polymeric film and a Teflon film.

4. The method according to claim 1, wherein said plurality of organic polymer particles have a granular diameter between 50 nanometers (nm) and 500 nm.

5. The method according to claim 1, wherein said filling said solution into said vacant spaces between said nanoparticles further comprises a hydrogen reduction or a chemical reduction.

6. The method according to claim 1, wherein said metal ion solution is made of a material selected from a group consisting of a pure metal ion element and a mixture of metal ion elements; and wherein said metal ion element is selected from a group consisting of $Pt^{2+}$, $Pt^{4+}$, $Ir^{3+}$, $Rh^{3+}$, $Ru^{3+}$, $Pd^{2+}$ and $Os^{3+}$.

7. The method according to claim 1, wherein said catalyst metal element is made of a material selected from a group consisting of a pure metal element and an alloy of metal elements; and wherein said metal element is selected from a group consisting of a platinum group metal, ruthenium, rhodium, palladium, iridium and osmium.

8. The method according to claim 1, wherein said support is a perfluorinated proton exchange membrane.

9. The method according to claim 1, wherein said binder is a perfluroinated ion-exchange solution.

10. The method according to claim 1, wherein said hot-press treatment is operated at a temperature between 50° C. and 120° C.

11. The method according to claim 1, wherein said hot-press treatment is operated at a pressure between 1 atmosphere (atm) and 50 atm.

* * * * *